United States Patent
Ko et al.

(10) Patent No.: US 10,375,140 B2
(45) Date of Patent: Aug. 6, 2019

(54) WIRELESS RECEIVING APPARATUS, DATA PROCESSING MODULE, AND DATA PROCESSING METHOD, FOR RECEIVING VIDEO IMAGE

(71) Applicant: SAMSUNG ELECTRONICS CO., LTD., Suwon-si (KR)

(72) Inventors: Hyun Jung Ko, Seongnam-si (KR); Jin Lee, Suwon-si (KR); Hyun Koo Kang, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/683,935

(22) Filed: Aug. 23, 2017

(65) Prior Publication Data

US 2018/0063214 A1 Mar. 1, 2018

(30) Foreign Application Priority Data

Aug. 23, 2016 (KR) .................. 10-2016-0106719

(51) Int. Cl.
*G06F 11/10* (2006.01)
*H03M 13/00* (2006.01)
(Continued)

(52) U.S. Cl.
CPC .......... *H04L 65/604* (2013.01); *H04L 1/0014* (2013.01); *H04L 1/0061* (2013.01);
(Continued)

(58) Field of Classification Search
CPC . H04L 65/604; H04L 65/4069; H04L 1/0061; H04L 69/324; H04L 69/40; H04L 69/14; H04B 17/309; H04W 84/12
See application file for complete search history.

(56) References Cited

U.S. PATENT DOCUMENTS 8,750,388 B2 6/2014 Okajima
2006/0034186 A1 2/2006 Kim et al.
(Continued)

FOREIGN PATENT DOCUMENTS

KR 10-2003-0058118 A 7/2003
KR 10-2006-0071918 A 6/2006

OTHER PUBLICATIONS

International Search Report and Written Opinion (PCT/ISA/210 and PCT/ISA/237), dated Dec. 7, 2017 by International Searching Authority in International Application No. PCT/KR2017/008966.
(Continued)

*Primary Examiner* — Samir W Rizk
(74) *Attorney, Agent, or Firm* — Sughrue Mion, PLLC

(57) ABSTRACT

A wireless receiving apparatus includes a plurality of wireless receiving modules that receive a plurality of sub-streams constituting a video frame from a wireless transmitting apparatus and a data processing module that determine whether an error occurs in each of the plurality of sub-streams, in response to determining that an error does not occur in any of the plurality of sub-streams, merges the plurality of sub-streams to generate the video frame, transmits the video frame to a display electrically connected to the wireless receiving apparatus, and in response to determining that an error occurs in at least one of the plurality of sub-streams, transmits an immediately-preceding video frame to the display.

19 Claims, 7 Drawing Sheets

(51) Int. Cl.
    *H04L 29/06*     (2006.01)
    *H04L 1/00*     (2006.01)
    *H04L 29/08*     (2006.01)
    *H04L 29/14*     (2006.01)
    *H04N 19/895*     (2014.01)
    *H04N 21/2343*     (2011.01)
    *H04N 21/4363*     (2011.01)
    *H04N 21/4402*     (2011.01)
    *H04N 21/462*     (2011.01)
    *H04B 17/309*     (2015.01)
    *H04W 84/12*     (2009.01)
    *H04N 21/242*     (2011.01)

(52) U.S. Cl.
    CPC ...... *H04L 65/4015* (2013.01); *H04L 65/4069* (2013.01); *H04L 69/14* (2013.01); *H04L 69/324* (2013.01); *H04L 69/40* (2013.01); *H04N 19/895* (2014.11); *H04N 21/234327* (2013.01); *H04N 21/43637* (2013.01); *H04N 21/440227* (2013.01); *H04N 21/4622* (2013.01); *H04B 17/309* (2015.01); *H04N 21/242* (2013.01); *H04W 84/12* (2013.01)

(56) References Cited

U.S. PATENT DOCUMENTS

| | | |
|---|---|---|
| 2007/0202842 A1 | 8/2007 | Shao et al. |
| 2010/0098185 A1 | 4/2010 | Miyazaki |
| 2011/0007168 A1 | 1/2011 | Nagara et al. |
| 2011/0286531 A1 | 11/2011 | Okajima |
| 2012/0069144 A1 | 3/2012 | Li et al. |
| 2012/0128071 A1* | 5/2012 | Celetto ............... H04N 19/139 375/240.16 |

OTHER PUBLICATIONS

Communication dated Apr. 19, 2019 issued by the European Intellectual Property Office in counterpart European Application No. 17843878.4.

* cited by examiner

WIRELESS RECEIVING APPARATUS, DATA PROCESSING MODULE, AND DATA PROCESSING METHOD, FOR RECEIVING VIDEO IMAGE

CROSS-REFERENCE TO RELATED APPLICATION(S)

This application claims priority from Korean patent application No. 10-2016-0106719, filed on Aug. 23, 2016 in the Korean Intellectual Property Office, the entire disclosure of which is hereby incorporated by reference.

BACKGROUND

1. Field

Apparatuses and methods consistent with exemplary embodiments relate to a wireless receiving apparatus, a data processing module, and a data processing method, for receiving a video image.

2. Description of the Related Art

With the advancement of image technology, display devices supporting high-definition (HD) image data have been developed. Recently, display devices supporting image data of not only HD or full HD (FHD) resolution but also ultra HD (UHD) resolution have appeared. Accordingly, technology for transmitting or receiving HD video data through wired or wireless communication has also been developed.

Various technologies for wirelessly transmitting the HD video data have been proposed. Conventionally, wireless video transmission technology has been based on Wi-Fi of the 2.4 GHz/5 GHz band or wirelessHD (WiHD) and a wireless gigabit alliance (WiGIG) of the 60 GHz band.

The WiHD-based video data transmitting and receiving system may transmit or receive video data of a FHD resolution in real time. However, in a case in which video data of a UHD resolution is transmitted thereto, image quality may be reduced depending on a state of a wireless channel.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide a wireless transmitting apparatus, a SoC, and a method for stably transmitting video data without image damage or image degradation even though quality of a wireless channel is not good when transmitting video data of a UHD resolution or higher.

According to an aspect of an exemplary embodiment, there is provided a wireless receiving apparatus including: a plurality of wireless receivers configured to receive a plurality of sub-streams constituting a video frame; and a data processor configured to: determine whether an error occurs in each of the plurality of sub-streams; in response to determining that an error does not occur in any of the plurality of sub-streams, merge the plurality of sub-streams to generate the video frame; transmit the video frame to a display that is electrically connected to the wireless receiving apparatus; and in response to determining that an error occurs in at least one of the plurality of sub-streams, transmit an immediately-preceding video frame to the display.

The data processor may be further configured to: determine whether reception of the plurality of sub-streams constituting the video frame is completed using total transmission period information and time index information of a video frame included in a header of each of the plurality of sub-streams; and in response to determining that the reception of the plurality of sub-streams constituting the video frame is not completed, transmit the immediately-preceding video frame to the display.

The data processor may be further configured to, in response to determining that the reception of the plurality of sub-streams constituting the video frame is not completed, temporarily store some of the plurality of sub-streams constituting the video frame in a memory.

The data processor may be further configured to, in response to determining that reception of a remainder of the plurality of sub-streams constituting the video frame is completed, merge some of the plurality of sub-streams temporarily stored in the memory with the remainder of the plurality of sub-streams to generate the video frame.

The data processor may be further configured to verify channel index information included in a header of the each of the plurality of sub-streams and merge the plurality of sub-streams in a combination order based on the channel index information.

The data processor may be further configured to differentiate a valid bit and a dummy bit of a payload of each of the plurality of sub-streams using pixel partitioning information included in a header of each of the plurality of sub-streams and merge respective valid bits of the plurality of sub-streams to generate the video frame.

The data processor may be further configured to verify a position of a cyclic redundancy check (CRC) code included in each of the plurality of sub-streams using payload length information included in a header of each of the plurality of sub-streams and determine whether an error occurs in each of the plurality of sub-streams using the CRC code.

The data processor may be further configured to verify a compression rate of the video frame using compression rate information included in a header of each of the plurality of sub-streams, decompress the video frame to correspond to the compression rate, and transmit the decompressed video frame to the display.

The data processor may be further configured to convert a format of the video frame to a format capable of being played in the display and transmit the video frame, the format of which is converted, to the display.

According to an aspect of another exemplary embodiment, there is provided a data processor including: a cyclic redundancy check (CRC) calculator configured to determine whether an error occurs in each of a plurality of sub-streams received from a plurality of wireless receiving apparatuses; a stream merger configured to, in response to determining that an error does not occur in any of the plurality of sub-streams, merge the plurality of sub-streams to generate a video frame; and a main controller configured to, in response to determining that an error does not occur in any of the plurality of sub-streams, transmit the video frame to a display that is electrically connected to the wireless receiving apparatus, and in response to determining that an error occurs in at least one of the plurality of sub-streams, transmit an immediately-preceding video frame to the display.

The stream merger may be further configured to determine whether reception of the plurality of sub-streams constituting the video frame is completed using total transmission period information and time index information of a video frame included in a header of each of the plurality of sub-streams, and in response to determining that the reception of the plurality of sub-streams constituting the video frame is not completed, temporarily store some of the plurality of sub-streams in a memory.

The stream merger may be further configured to, in response to determining that reception of a remainder of the plurality of sub-streams constituting the video frame is completed, merge some of the plurality of sub-streams temporarily stored in the memory with the remainder of the plurality of sub-streams to generate the video frame.

The main controller may be further configured to, in response to determining that the reception of the plurality of sub-streams constituting the video frame is not completed, transmit the immediately-preceding video frame to the display.

The stream merger may be further configured to verify channel index information included in a header of each of the plurality of sub-streams and merge the plurality of sub-streams in a combination order based on the channel index information.

The stream merger may be further configured to differentiate a valid bit and a dummy bit of a payload of each of the plurality of sub-streams using pixel partitioning information included in a header of each of the plurality of sub-streams and merge respective valid bits of the plurality of sub-streams to generate the video frame.

The CRC calculator may be further configured to verify a position of a CRC code included in each of the plurality of sub-streams using payload length information included in a header of each of the plurality of sub-streams, and determine whether an error occurs in each of the plurality of sub-streams using the CRC code.

The data processor may further include a decoder configured to verify a compression rate of the video frame using compression rate information included in a header of each of the plurality of sub-streams, decompress the video frame to correspond to the compression rate, and transmit the decompressed video frame to the display.

The data processor may further include a video reconstructor configured to convert a format of the video frame to a format capable of being played in the display and transmit the video frame, the format of which is converted, to the display.

The data processor may further include a plurality of stream converters configured to receive a plurality of sub-streams from the plurality of wireless receiving apparatuses, convert a format of the plurality of sub-streams, and transmit the plurality of sub-streams, the format of which is converted, to the CRC calculator.

According to an aspect of another exemplary embodiment, there is provided a video reconstructing method of a wireless receiving apparatus, the method including: receiving a plurality of sub-streams constituting a video frame; determining whether an error occurs in each of the plurality of sub-streams; in response to determining that an error does not occur in any of the plurality of sub-streams, merging the plurality of sub-streams to generate the video frame; transmitting the video frame to a display that is electrically connected to the wireless receiving apparatus; and in response to determining that an error occurs in at least one of the plurality of sub-streams or reception of the plurality of sub-streams is not completed, transmitting an immediately-preceding video frame to the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages will be more apparent from the following description of exemplary embodiments, taken in conjunction with the accompanying drawings, in which.

DETAILED DESCRIPTION

Figure 1:
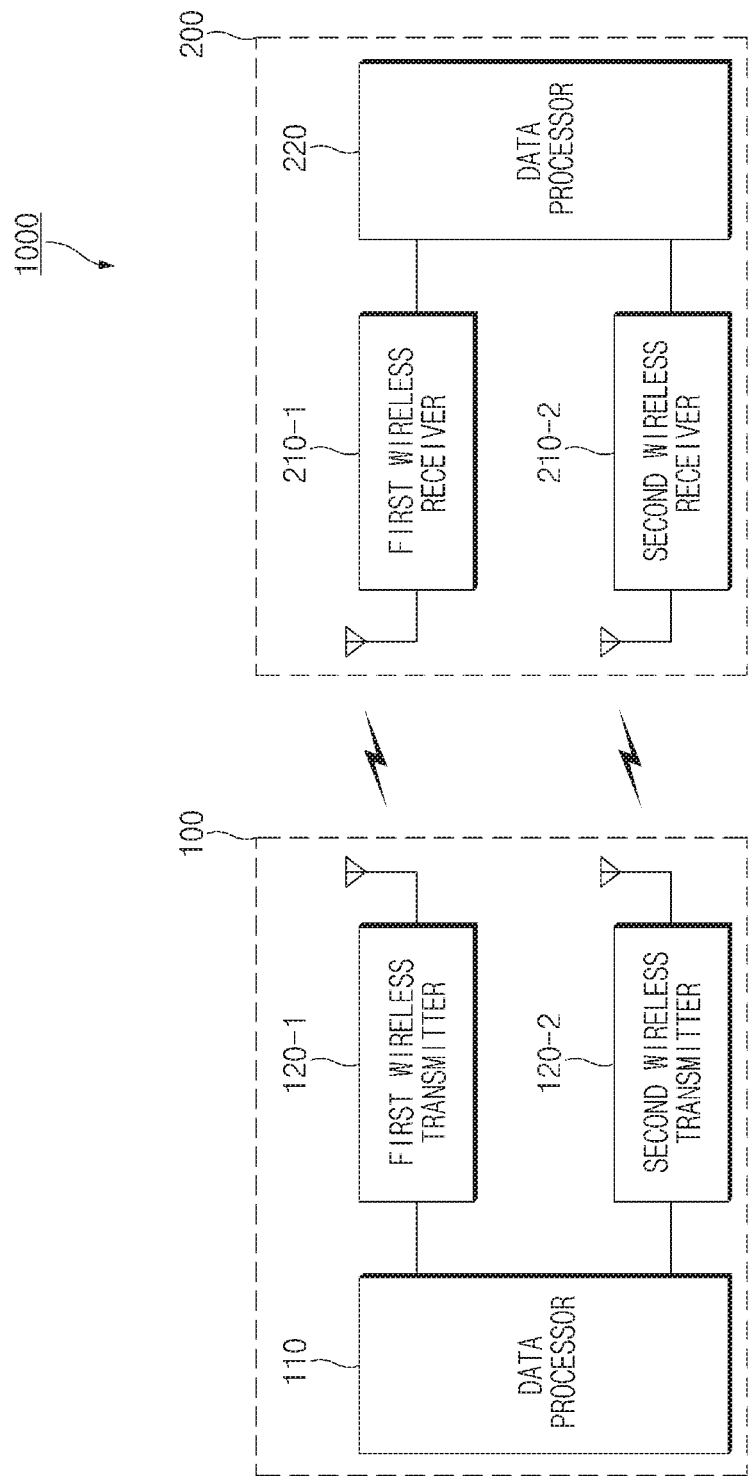
FIG. 1 is a block diagram illustrating a wireless transmitting and receiving system, according to an exemplary embodiment.

Reference will now be made in detail to exemplary embodiments with reference to accompanying drawings. Accordingly, those of ordinary skill in the art will recognize that modification, equivalent, and/or alternative on the various exemplary embodiments described herein can be variously made without departing from the scope and spirit of the present disclosure. With regard to description of drawings, similar elements may be marked by similar reference numerals.

In this disclosure, the expressions "have," "may have," "include," and "comprise," "may include," and "may comprise" used herein indicate existence of corresponding features (e.g., elements such as numeric values, functions, operations, or components) but do not exclude presence of additional features. In this disclosure, the expressions "A or B," "at least one of A or/and B," "one or more of A or/and B," and the like may include any and all combinations of one or more of the associated listed items. For example, the term "A or B," "at least one of A and B," or "at least one of A or B" may refer to all of (1) the case where at least one A is included, (2) the case where at least one B is included, or (3) the case where both of at least one A and at least one B are included.

The terms, such as "first," "second," and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" used in this disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe exemplary embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way unless expressly so defined in various exemplary embodiments of this disclosure. In some cases, even if terms are terms which are defined in this disclosure, they may not be interpreted to exclude embodiments of this disclosure.

Throughout the drawings, it should be noted that like reference numbers are used to depict the same or similar elements, features, and structures.

FIG. 1 is a block diagram illustrating a wireless transmitting and receiving system, according to an exemplary embodiment.

Referring to FIG. 1, a wireless transmitting and receiving system 1000 may include a wireless transmitting apparatus 100 and a wireless receiving apparatus 200. According to an aspect of an exemplary embodiment, the wireless transmitting apparatus 100 may transmit video data (or a video frame) of a frame unit to the wireless receiving apparatus 200 over a wireless network.

The wireless transmitting apparatus 100 may include data processor (or data processing circuit) 110 and a plurality of wireless transmitters (or wireless transmitting circuits) 120-1 and 120-2. The wireless transmitting apparatus 100 may be a video image source device, and may be, for example, a set-top box, a smartphone, a tablet personal computer (PC), and a notebook PC.

The data processor 110 of the wireless transmitting apparatus 100 may generate a plurality of sub-streams by using the video frame (or the video data). Before generating the plurality of sub-streams, the data processor 110 may compress the video frame. For example, the video frame may be content that is received from an external device or stored in an internal (or external) recording medium. For example, the recording medium may include a compact disc (CD), a digital versatile disc (DVD), a hard disk, a Blu-lay disc, a memory card, a universal serial bus (USB), and the like.

The data processor 110 may generate a plurality of sub-streams, which have a specified format, by using the video frame. For example, each of the plurality of sub-streams may include a header and a cyclical redundancy check (CRC) code including information about a sub-stream. After changing the format of each of the plurality of sub-streams into a first video format, the data 110 may transmit the plurality of sub-streams of first video format to the plurality of wireless transmitters 120-1 and 120-2. The first video format may be the video format (e.g., a Consumer Electronics Association (CEA) format) that is capable of being output to a display. For example, the first video format may be a video format including red, green, and blue (RGB) raw data and a synchronization signal (e.g., Vsync, Hsync, or a data enable (DE) signal).

The plurality of wireless transmitters 120-1 and 120-2 may transmit the sub-stream received from the data processor 110 to the plurality of wireless receivers (or wireless receiving circuits) 210-1 and 210-2 of the wireless receiving apparatus 200. Each of the plurality of wireless transmitters 120-1 and 120-2 may be a WiHD module. The plurality of wireless transmitters 120-1 and 120-2 may transmit the plurality of sub-streams to the plurality of wireless receivers 210-1 and 210-2 according to the WiHD standard.

Each of the plurality of wireless transmitters 120-1 and 120-2 may verify the state of a channel through which video data is transmitted. For example, each of the plurality of wireless transmitters 120-1 and 120-2 may receive channel state information from the plurality of wireless receivers 210-1 and 210-2 of the wireless receiving apparatus 200 and may verify the state of the channel based on the received channel state information. For example, the channel state information may include a packet error rate (PER) and a signal-to-noise ratio (SNR). The data processor 110 may determine at least one of the compression rate of the video frame, an amount of data (or a load sharing rate) of the video frame to be included in each of the plurality of sub-streams, and the number of sub-streams (or the total transmission period of the video frame) based on the channel state information received from each of the plurality of wireless transmitters 120-1 and 120-2.

Each of the plurality of wireless transmitters 120-1 and 120-2 may selectively perform pixel partitioning depending on a channel state. Alternatively, the data processor 110 may determine whether each of the plurality of wireless transmitters 120-1 and 120-2 performs the pixel partitioning, based on the channel state information. If the pixel partitioning is performed, each of the plurality of wireless transmitters 120-1 and 120-2 may remove a part of data included in the sub-stream for robust transmission. If the pixel partitioning is performed by the plurality of wireless transmitters 120-1 and 120-2, the data processor 110 may generate the sub-stream in consideration of an area in which data is to be removed by the pixel partitioning such that the data included in the sub-stream is not lost.

The data processor 110 may determine at least one of the compression rate of the video frame, an amount of data (or a load sharing rate) of the video frame to be included in each of the plurality of sub-streams, and the number of sub-streams (or the total transmission period of the video frame) based on pixel partitioning information received from at least one of the plurality of wireless transmitters 120-1 and 120-2.

The wireless receiving apparatus 200 may include a plurality of wireless receivers 210-1 and 210-2 and a data processor 220. The wireless receiving apparatus 200 may be a video sink device such as a TV, a smartphone, a tablet PC, and a notebook PC. The wireless receiving apparatus 200 may include the display or may be electrically connected with a separate display device.

The plurality of wireless receivers 210-1 and 210-2 may receive a plurality of sub-streams from the plurality of wireless transmitters 120-1 and 120-2 of the wireless transmitting apparatus 100. The plurality of wireless receivers 210-1 and 210-2 may be WiHD modules. According to the WiHD standard, each of the plurality of wireless receivers 210-1 and 210-2 may receive the plurality of sub-streams. For example, the plurality of wireless receivers 210-1 and 210-2 may receive the sub-stream of the first video format from the plurality of wireless transmitters 120-1 and 120-2. The plurality of wireless receivers 210-1 and 210-2 may transmit the received plurality of sub-streams to the data processor 220.

Each of the plurality of wireless receivers 210-1 and 210-2 may verify the state of the channel, through which video data is transmitted, based on the received video data. The plurality of wireless receivers 210-1 and 210-2 may transmit the channel state information (e.g., the PER, the SNR, or the like) to the plurality of wireless transmitters 120-1 and 120-2. If it is verified that a part of data is removed by the pixel partitioning of each of the wireless transmitters 120-1 and 120-2, each of the wireless receivers 210-1 and 210-2 may insert dummy data into an area in which the part of the data is removed such that a data structure before the data is removed is reconstructed. The reconstructed data may be transmitted to the data processor 220.

The data processor 220 of the wireless receiving apparatus 200 may generate (or reconstruct) the video frame by merging the plurality of sub-streams received from the plurality of wireless receivers 210-1 and 210-2. The wireless receiving apparatus 200 may output the video frame through the display electrically connected with the wireless receiving apparatus 200. The data processor 220 may determine whether an error has occurred in the sub-stream, by using the CRC code included in the sub-stream. If the reception of a video frame is not completed at a point in time when the video frame is to be output, or if an error occurred in the received video frame, the data processor 220 of the wireless receiving apparatus 200 may output the immediately-preceding video frame instead of a video frame to be currently output.

The wireless transmitting apparatus 100 and the wireless receiving apparatus 200 may include the plurality of wireless transmitters 120-1 and 120-2 and the plurality of wireless receivers 210-1 and 210-2, respectively. Here, the number of wireless transmitters 120-1 and 120-2 may be the same as the number of wireless receivers 210-1 and 210-2. For example, as illustrated in FIG. 1, the wireless transmitting apparatus 100 may include the first wireless transmitters 120-1 and the second wireless transmitters 120-2, and the wireless receiving apparatus 200 may include the first wireless receiver 210-1 and the second wireless receiver 210-2.

Each of the plurality of wireless transmitters 120-1 and 120-2 may communicate with one of the plurality of wireless receivers 210-1 and 210-2. For example, the first wireless transmitters 120-1 may communicate with the first wireless receiver 210-1 through a first wireless channel, and the second wireless transmitters 120-2 may communicate with the second wireless receiver 210-2 through a second wireless channel.

In an aspect of an exemplary embodiment described with reference to FIG. 1, the wireless transmitting apparatus 100 and the wireless receiving apparatus 200 are described as including two wireless transmitters and two wireless receivers, respectively. However, the number of wireless transmitters and the number of wireless receivers are not limited thereto. For example, the number of wireless transmitters and wireless receivers may be three or more.

The WiHD-based transmitting and receiving system may transmit or receive video data of a FHD resolution in real time. However, in the case where UHD video data of an UHD resolution is transmitted, conventionally the image quality may be reduced depending on the state of a wireless channel. According to an aspect of an exemplary embodiment, the wireless transmitting apparatus 100 may adjust at least one of the compression rate of the video frame, an amount of data (or a load sharing rate) of the video frame to be included in each of a plurality of sub-streams, and the total transmission period of the video frame depending on the wireless channel state. As a result, the video frame may be stably transmitted even when the wireless channel quality is low.

According to an aspect of an exemplary embodiment, in the case where the pixel partitioning is performed by wireless transmitters, the wireless transmitting apparatus 100 may generate the sub-stream in consideration of the pixel partitioning, thereby preventing data from being lost due to the pixel partitioning.

After dividing the video frame into a plurality of sub-streams, the wireless transmitting apparatus 100 may transmit the divided plurality of sub-streams and may add information (e.g., the CRC code) for determining whether an error occurs, to each of the plurality of sub-streams. Therefore, the wireless transmitting apparatus 100 may allow the wireless receiving apparatus 200 to easily determine whether an error occurs in the video frame, independently of the error detection by a wireless transmitter and a wireless receiver.

In the case where an error occurs in the received video frame or in the case where the reception of the video frame is delayed, the wireless receiving apparatus 200 may output an alternative video frame (e.g., an immediately-preceding video frame), thereby allowing the user to perceive the degradation of image quality or image errors to a lesser degree.

Figure 2:
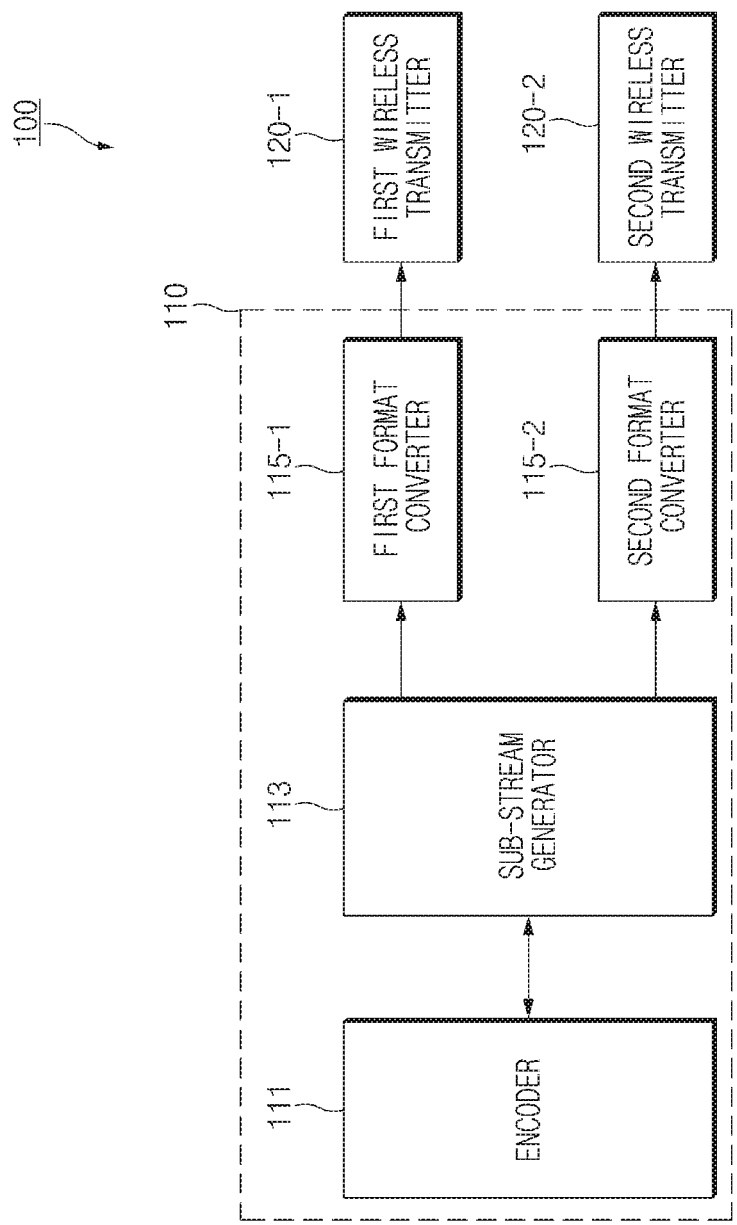
FIG. 2 is a block diagram illustrating a configuration of a wireless transmitting apparatus, according to an exemplary embodiment.

FIG. 2 is a block diagram illustrating a configuration of a wireless transmitting apparatus, according to an exemplary embodiment.

Referring to FIG. 2, the wireless transmitting apparatus 100 may include the data processor 110 and the plurality of wireless transmitters 120-1 and 120-2. According to an aspect of an exemplary embodiment, the data processor 110 may include an encoder 111, a sub-stream generator 113, and a plurality of format converters 115-1 and 115-2. The elements of the data processor 110 illustrated in FIG. 2 may be a separate hardware module or may be a software module implemented by at least one processor. For example, the function of each of modules or components included in the data processor 110 may be performed by one processor or may be performed by multiple processors. The data processor 110 may be implemented with a SoC including at least one processor, a memory, and the like.

The encoder 111 may compress a video frame. The encoder 111 may perform lossless compression or visually lossless compression. In some exemplary embodiments, the encoder 111 may be omitted.

The encoder 111 may receive the video frame of a first video format. The first video format may be a video format (e.g., a CEA format) that is capable of being output to a display. For example, the first video format may be a video format including RGB raw data and a synchronization signal (e.g., Vsync, Hsync or a DE signal). The encoder 111 may select and compress only RGB raw data of data included in the video frame, other than a synchronization signal.

The encoder 111 may determine whether the video frame is compressed, based on the resolution of the video frame. For example, if the resolution of the video frame is greater than a first specified reference (e.g., FHD (1920×1080) or UHD (3840×2260)), the encoder 111 may perform compression (e.g., compressing a video frame of the UHD resolution into a video frame of FHD resolution or HD resolution). If the resolution of the video frame is less than the first specified reference, the encoder 111 may not perform compression.

The encoder 111 may determine whether the video frame is compressed, and a compression rate based on channel state information received from the plurality of wireless transmitters 120-1 and 120-2. For example, if a channel state information is not less than a second specified reference value (e.g., the channel state indicates a state value greater than the second specified reference value) compared with the resolution of the video frame, the encoder 111 may not perform the compression. If the channel state is less than the second specified reference value (e.g. the channel state indicates a state value that is less than the second specified reference value), the encoder 111 may perform the compression. As another example, as the channel state improves, the encoder 111 may decrease the compression rate of the video frame. As the channel state deteriorates, the encoder 111 may increase the compression rate of the video frame.

The encoder 111 may determine the compression rate of the video frame based on the representative value of the channel state information of the plurality of wireless transmitters 120-1 and 120-2. For example, the encoder 111 may determine the compression rate of the video frame based on an average value, a maximum value, or a minimum value of the channel state information received from each of the plurality of wireless transmitters 120-1 and 120-2.

The sub-stream generator 113 may generate a plurality of sub-streams by using the (compressed or uncompressed) video frame. In the case where the compression is not performed by the encoder 111, the sub-stream generator 113 may receive the video frame of a first video format. If the video frame of the first video format is received, the sub-stream generator 113 may generate a plurality of sub-streams by using only the RGB raw data that excludes a data synchronization signal from data included in the video frame. The sub-stream generator 113 may divide the video frame into a plurality of data groups. The sub-stream generator 113 may generate the plurality of sub-streams after inserting a header and a CRC code into each of the divided data groups. The structure of a sub-stream will be described with reference to FIG. 3.

The sub-stream generator 113 may determine an amount of data (or a load sharing rate) of the video frame to be included in each of the plurality of sub-streams based on the channel state information received from each of the plurality of wireless transmitters 120-1 and 120-2. The sub-stream generator 113 may increase the amount of data to be included in the sub-stream transmitted through a wireless transmitter of which the channel state is relatively good (e.g., above a predetermined quality measurement value). The sub-stream generator 113 may decrease the amount of data to be included in the sub-stream transmitted through a wireless transmitter of which the channel state is relatively bad (e.g., below a predetermined quality measurement value).

The sub-stream generator 113 may generate the sub-stream, the number of which corresponds to a multiple of the number of wireless transmitters, by using one video frame. For example, as illustrated in FIG. 2, in the case where the wireless transmitting apparatus 100 includes two wireless transmitters 120-1 and 120-2, the sub-stream generator 113 may generate sub-streams of 2×n by using one video frame.

The sub-stream generator 113 may determine the number of sub-streams (or the total transmission period of the video frame) based on the channel state information received from each of the plurality of wireless transmitters 120-1 and 120-2. The sub-stream generator 113 may determine whether one video frame is capable of being transmitted within a specified transmission period, by using the channel state information. For example, the sub-stream generator 113 may store first mapping information obtained by mapping the channel state information and the maximum amount of data information corresponding to the channel state information (e.g., in an internal memory). The sub-stream generator 113 may determine whether the video frame is capable of being transmitted within the specified transmission period, with reference to the first mapping information. For example, when the channel state is normal (e.g., the channel state information is not less than a third specified reference), the specified transmission period may indicate a time required to transmit one video frame.

If one video frame is capable of being transmitted within the specified transmission period, the sub-stream generator 113 may generate sub-streams of the same number (e.g., two) as the number of wireless transmitters. For example, the sub-stream generator 113 may generate a first sub-stream and a second sub-stream, which are to be transmitted during the specified transmission period, by using one video frame. If one video frame is not capable of being transmitted within the specified transmission period, the sub-stream generator 113 may generate sub-streams, the number (e.g., four or six) of which is greater than the number of wireless transmitters. For example, the sub-stream generator 113 may generate the first sub-stream and the second sub-stream, which are to be transmitted during a first transmission period, by using a part of the video frame. The sub-stream generator 113 may generate a third sub-stream and a fourth sub-stream, which are to be transmitted during a second transmission period, by using the remaining part of the video frame.

In the case where the sub-stream generator 113 generates sub-streams of the number greater than the number of wireless transmitters, the sub-stream generator 113 may skip the generation of sub-streams using the next video frame. For example, in the case where the sub-stream generator 113 generates sub-streams, which are to be transmitted during two transmission periods, by using a first video frame, the sub-stream generator 113 may skip the generation of sub-streams using a second video frame and may generate a plurality of sub-streams using a third video frame.

After changing each of the plurality of sub-streams into a sub-stream of a second video format capable of being supported according to the WiHD standard, the plurality of format converters 115-1 and 115-2 may transmit the sub-stream of the second video format to the plurality of wireless transmitters 120-1 and 120-2, respectively.

Each of the plurality of wireless transmitters 120-1 and 120-2 may transmit a sub-stream of the second video format received from the data processor 110 to the wireless receiving apparatus 200 according to the WiHD standard. Each of the plurality of wireless transmitters 120-1 and 120-2 may correspond to a media access control (MAC) layer and a physical (PHY) layer that are defined in the WiHD standard. After inserting a CRC code into the sub-stream, each of the plurality of wireless transmitters 120-1 and 120-2 may perform channel coding and modulation. Each of the plurality of wireless transmitters 120-1 and 120-2 may select at least one of channels of a frequency band (e.g., a band of 60 GHz) defined in the WiHD standard and may transmit the sub-stream through the selected channel in units of a packet. Each of the plurality of wireless transmitters 120-1 and 120-2 may monitor the channel state and may transmit the channel state information to the data processor 110.

Each of the plurality of wireless transmitters 120-1 and 120-2 may perform pixel partitioning depending on the channel state. For example, if the channel state information is not greater than a fourth specified reference, the plurality of wireless transmitters 120-1 and 120-2 may remove a part of the data included in the sub-stream for robust transmission. As the channel state becomes worse, the plurality of wireless transmitters 120-1 and 120-2 may increase a removal rate of data. In the case where each of the plurality of wireless transmitters 120-1 and 120-2 performs the pixel partitioning, each of the plurality of wireless transmitters 120-1 and 120-2 may transmit pixel partitioning information to the sub-stream generator 113. For example, the pixel partitioning information may be information indicating the configuration form (e.g., a ratio, a location, or the like) of actual data and dummy data included in the sub-stream to be transmitted to the wireless receiving apparatus 200.

The encoder 111 may determine the compression rate of the video frame based on the pixel partitioning information. For example, as the ratio of the dummy data becomes higher (or as the ratio of actual data becomes lower), the encoder 111 may increase the compression rate of the video frame. As the ratio of the dummy data becomes lower (or as the ratio of actual data becomes higher), the encoder 111 may decrease the compression rate of the video frame.

If the pixel partitioning is performed by the plurality of wireless transmitters 120-1 and 120-2, the sub-stream generator 113 may generate the sub-stream based on the pixel partitioning information in consideration of an area in which data is removed by the pixel partitioning such that data included in the sub-stream is not lost. For example, the sub-stream generator 113 may generate the sub-stream such that the video data is included in an area in which the data is not removed by the pixel partitioning.

The sub-stream generator 113 may determine the amount of data to be included in the plurality of sub-streams based on the pixel partitioning information. If only a part of the plurality of wireless transmitters 120-1 and 120-2 performs the pixel partitioning, the amount of data of the sub-stream to be transmitted through a wireless transmitter performing the pixel partitioning may decrease and the amount of data of the sub-stream to be transmitted through a wireless transmitter not performing the pixel partitioning may increase. As the channel state becomes worse, the ratio of actual data in the pixel partitioning information may decrease and the ratio of dummy data in the pixel partitioning information may increase. As the ratio of actual data in the pixel partitioning information becomes higher, the sub-stream generator 113 may increase the amount of data to be included in the sub-stream. As the ratio of actual data becomes lower, the sub-stream generator 113 may decrease the amount of data to be included in the sub-stream.

The sub-stream generator 113 may determine the number of sub-streams (or the total transmission period of the video frame) based on the pixel partitioning information. The sub-stream generator 113 may determine whether one video frame is transmitted within a specified transmission period, by using the pixel partitioning information. For example, the sub-stream generator 113 may store second mapping information obtained by mapping a ratio of the actual data to the dummy data and the maximum amount of data information corresponding to the ratio of the actual data to the dummy data (e.g., in an internal memory). The sub-stream generator 113 may determine whether the video frame is capable of being transmitted within the specified transmission period, based on the second mapping information.

If one video frame is capable of being transmitted within the specified transmission period, the sub-stream generator 113 may generate sub-streams of the same number (e.g., two) as the number of wireless transmitters. If one video frame is not capable of being transmitted within the specified transmission period, the sub-stream generator 113 may generate sub-streams, the number (e.g., four or six) of which is greater than the number of wireless transmitters.

Figure 3:
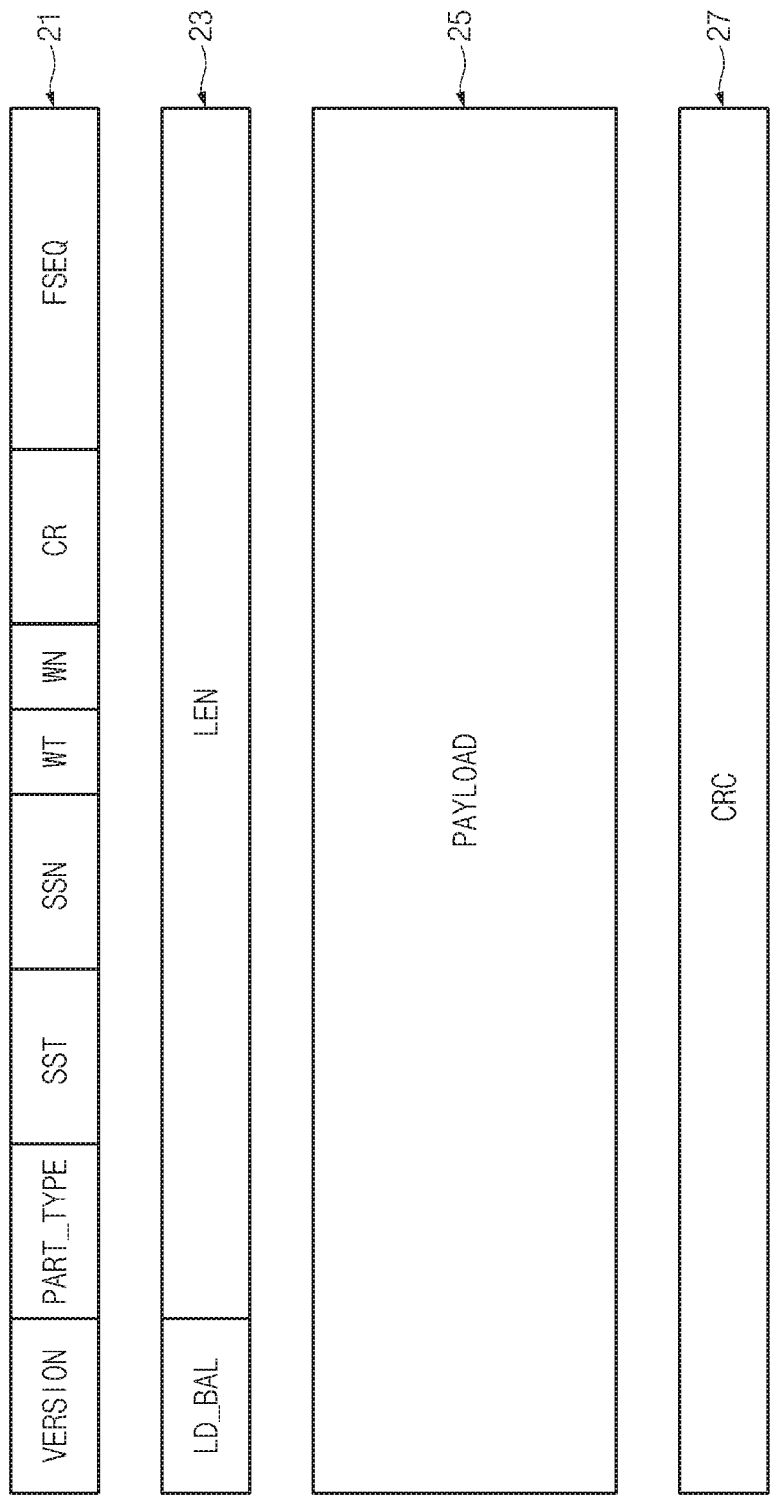
FIG. 3 is a diagram illustrating a structure of a sub-stream, according to an exemplary embodiment.

FIG. 3 is a diagram illustrating a structure of a sub-stream, according to an exemplary embodiment.

Referring to FIG. 3, the sub-stream may include a first header 21, a second header 23, a payload 25, and a CRC field 27.

According to an aspect of an exemplary embodiment, the first header 21 may include a version field VERSION, a partitioning type field PART_TYPE, a SST field, a SSN field, a WT field, a WN field, a CR field, and a FSEQ field. For example, the first header 21 may have a size of 32 bits.

The version field VER may include version information of the sub-stream. For example, the version information may be information indicating the structure of the sub-stream. The wireless receiving apparatus 200 may verify the structure of the sub-stream, which is generated by the wireless transmitting apparatus 100, by using the version information. The wireless receiving apparatus 200 may reconstruct a video frame by using a plurality of sub-streams depending on the verified structure of the sub-stream. In the case where the structure of the sub-stream is defined in advance between the wireless transmitting apparatus 100 and the wireless receiving apparatus 200, the version field VER may be omitted. The number of bits of each field included in the first header 21 and the second header 23 may vary depending on the version information, and the version information may be used to determine the number of bits of each of the fields.

The partitioning type field PART_TYPE may include pixel partitioning information. The pixel partitioning information may be information indicating the configuration form (e.g., a ratio, a location, or the like) of actual data and dummy data included in the sub-stream to be transmitted to the wireless receiving apparatus 200. The pixel partitioning information may include a value indicating a state where a wireless transmitter does not perform pixel partitioning. For example, in the case where the pixel partitioning is not performed by the wireless transmitter, the partitioning type field PART_TYPE may be set to '0'.

The SST field may include the total transmission period information of the video frame. The total transmission period information may refer to total transmission period information set to transmit one video frame. The total period information may be related to the total number of sub-streams generated from one video frame. For example, in the case where one video frame is divided into two sub-streams and the two sub-streams are transmitted through the first wireless transmitter 120-1 and the second wireless transmitter 120-2 during one transmission period, the SST field of each of the sub-streams may be set to '0'. As another example, in the case where one video frame is divided into four sub-streams and the four sub-streams are transmitted through the first wireless transmitter 120-1 and the second wireless transmitter 120-2 during two transmission periods, the SST field of each of the sub-streams may be set to '1'.

The SSN field may include time index information of the sub-stream. The time index information may be time division information of a plurality of sub-streams and may be time index information of a plurality of sub-streams to be transmitted during a plurality of transmission periods. For example, in the case where one video frame is divided into four sub-streams and the four sub-streams are transmitted through the first wireless transmitter 120-1 and the second wireless transmitter 120-2 during two transmission periods, the SSN field of each of two sub-streams to be transmitted during a first transmission period may be set to '0', and the SSN field of each of two sub-streams to be transmitted during a second transmission period may be set to '1'.

The WT field may include information about the total number of wireless channels. For example, the information about the total number of wireless channels may correspond to the number of wireless transmitters (or the number of wireless channels formed to transmit sub-streams between a plurality of wireless transmitters and a plurality of wireless receivers). For example, in the case where the number of wireless channels is two, the WT field may be set to '1'. As another example, in the case where the number of wireless channels is three, the WT field may be set to '2'.

The WN field may include channel index information. The channel index information may be information for identifying a channel (or a wireless transmitter transmitting the sub-stream) through which the sub-stream is transmitted. For example, in the case where there are a first wireless channel and a second wireless channel for transmitting sub-streams, the WN field of a sub-stream to be transmitted through the first wireless channel may be set to '0', and the WN field of a sub-stream to be transmitted through the second wireless channel may be set to '1'. When generating the video frame by merging a plurality of sub-streams, the wireless receiving apparatus 200 may determine a combination order of the plurality of sub-streams by using the channel index information.

The CR field may include compression rate information of the video frame. For example, the compression rate information may be information about a rate at which the data processor 110 compresses the video frame. For example, in the case where the compression rate of the video frame is ¼, the CR field may be set to '0'. As another example, in the case where the compression rate of the video frame is ⅛, the CR field may be set to '1'.

The FSEQ field may include sequence information of the video frame. The sequence information may indicate the sequence of the video frame, which is currently transmitted, from among all video frames. The wireless receiving apparatus 200 may transmit the video frame to a display depending on the sequence information of the video frame. The FSEQ field may be omitted.

According to an aspect of an exemplary embodiment, the second header 23 may include a LD_BAL field and a LEN field. For example, the second header 23 may have a size of 32 bits.

The LD_BAL field may include load balancing rate information. For example, the load balancing rate information may indicate the ratio of video data to be transmitted through each of a plurality of wireless channels (or the ratio of video data included in a plurality of sub-streams to be transmitted during one transmission period). For example, in the case where the amount of video data to be transmitted through a first wireless channel is the same as the amount of video data to be transmitted through a second wireless channel, the LD_BAL field of the plurality of sub-streams may be set to a value corresponding to 1:1. As another example, in the case where the amount of video data to be transmitted through a first wireless channel is twice the amount of video data to be transmitted through a second wireless channel, the LD_BAL field of the plurality of sub-streams may be set to a value corresponding to 2:1. For example, the LD_BAL field may have a size of 4 bits.

The LEN field may include length information of a payload of a sub-stream. The length information of the payload may be used such that the wireless receiving apparatus 200 differentiates the video data (i.e., payload) and a CRC code included in the sub-stream. For example, the LEN field may have a size of 28 bits.

The first header 21 and the second header 23 described with reference to FIG. 3 are merely exemplary and various embodiments are not limited thereto. For example, a type and the number of bits of each of the fields included in each of the first header 21 and the second header 23 may be variously set depending on an exemplary embodiment. In addition, a part of the fields included in the first header 21 may be included in the second header 23 or a part of the fields included in the second header 23 may be included in the first header 21.

According to an aspect of an exemplary embodiment, the payload 25 may include video data. The payload 25 may include a part of the video data constituting the video frame.

The CRC field 27 may include the CRC code. For example, the CRC field 27 may include the CRC code calculated by using at least a part of the first header 21, the second header 23, and the payload 25. For example, the CRC field 27 may have a size of 32 bits. The wireless receiving apparatus 200 may determine whether an error occurs, by using the CRC code inserted into the sub-stream independently of an error check that the wireless transmitter and wireless receiver perform.

Figure 4:
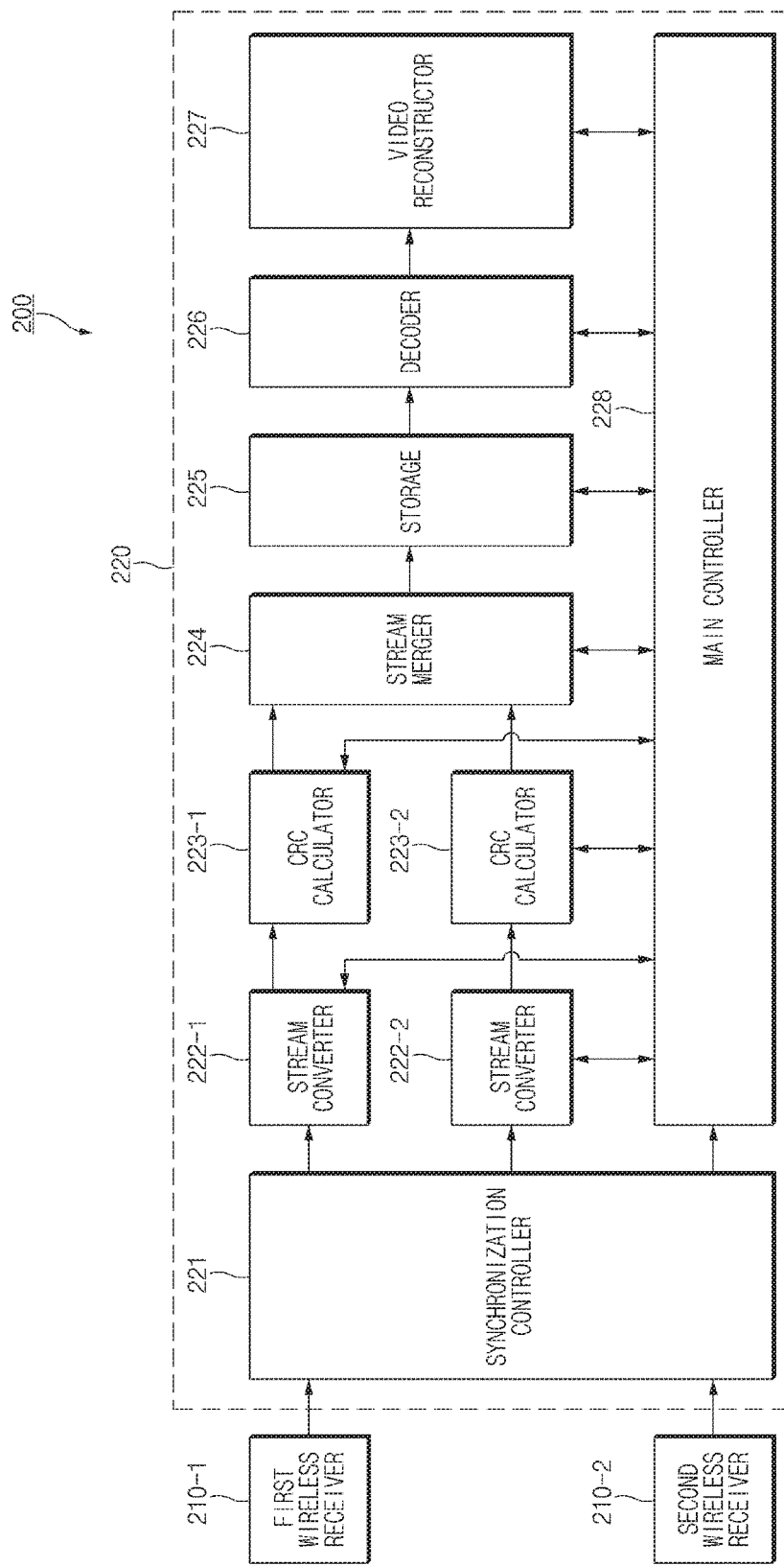
FIG. 4 is a block diagram illustrating a wireless receiving apparatus, according to an exemplary embodiment.

FIG. 4 is a block diagram illustrating a wireless receiving apparatus, according to an exemplary embodiment.

Referring to FIG. 4, the wireless receiving apparatus 200 may include the first wireless receiver 210-1, the second wireless receiver 210-2, and the data processor 220. According to an aspect of an exemplary embodiment, the data processor 220 may include a synchronization controller 221, a plurality of stream converters 222-1 and 222-2, a plurality of CRC calculators 223-1 and 223-2, a stream merger 224, storage 225 (e.g., memory), a decoder 226, a video reconstructor 227, and a main controller 228. The elements of the data processor 220 illustrated in FIG. 4 may be a separate hardware module or may be a software module implemented by at least one processor. For example, the function of each of the modules included in the data processor 220 may be performed by one processor or may be performed by each separate processor. The data processor 220 may be implemented with a SoC including at least one processor, a memory, and the like.

The plurality of wireless receivers 210-1 and 210-2 may receive a plurality of sub-streams from the plurality of wireless transmitters 120-1 and 120-2 of the wireless transmitting apparatus 100, respectively. Each of the plurality of wireless receivers 210-1 and 210-2 may be a WiHD module. The plurality of wireless receivers 210-1 and 210-2 may receive sub-streams having the second video format from the plurality of wireless transmitters 120-1 and 120-2, respectively. The plurality of wireless receivers 210-1 and 210-2 may transmit the received plurality of sub-streams to the synchronization controller 221. If it is verified that a part of data is removed by pixel partitioning of each of the wireless transmitters 120-1 and 120-2, each of the wireless receivers 210-1 and 210-2 may insert dummy data into an area in which the data is removed such that data structure before the data is removed is reconstructed, and may transmit the reconstructed data to the data processor 220.

The synchronization controller 221 may synchronize a plurality of sub-streams received from the plurality of wireless receivers 210-1 and 210-2. For example, the sub-streams received from the plurality of wireless receivers 210-1 and 210-2 may be of the second video format (e.g., a video format (e.g., a CEA format) capable of being output to a display). The synchronization controller 221 may synchronize the plurality of sub-streams by using a synchronization signal (e.g., a Vsync signal, a Hsync signal, a DE signal, or the like) included in the sub-streams. The synchronization controller 221 may transmit the synchronized plurality of sub-streams to the plurality of stream converters 222-1 and 222-2.

Each of the plurality of stream converters 222-1 and 222-2 may interpret header information of each of the sub-streams received from the synchronization controller 221. Each of the plurality of stream converters 222-1 and 222-2 may change the format of the sub-streams received from the synchronization controller 221 by using the header information. The interpreted header information may be transmitted to the main controller 228. The plurality of stream converters 222-1 and 222-2 may transmit a plurality of sub-streams, of which the format is changed, to the plurality of CRC calculators 223-1 and 223-2, respectively.

Each of the plurality of CRC calculators 223-1 and 223-2 may extract a CRC code included in each of the sub-streams received from the plurality of stream converters 222-1 and 222-2. For example, the plurality of CRC calculators 223-1 and 223-2 may verify a location of the CRC code included in each of the sub-streams by using length information of a payload included in a LEN field of the header of each of the sub-streams and may extract the CRC code from the verified location. Each of the plurality of CRC calculators 223-1 and 223-2 may calculate the CRC code by using a sub-stream in the same manner as that of the wireless transmitting apparatus. Each of the plurality of CRC calculators 223-1 and 223-2 may determine whether an error has occurred in the sub-stream, by comparing the CRC code extracted from the sub-stream with the calculated CRC code. Each of the plurality of CRC calculators 223-1 and 223-2 may transmit information about whether an error has occurred in the sub-stream, to the stream merger 224.

The stream merger 224 may receive the sub-stream from the plurality of stream converters 222-1 and 222-2 or the plurality of CRC calculators 223-1 and 223-2. The stream merger 224 may generate (or reconstruct) a video frame by merging a plurality of sub-streams. The stream merger 224 may generate the video frame by merging the sub-stream (or a normal sub-stream) in which the comparison result of the CRC code indicates that an error has not occurred. For example, if an error does not occurred in all the plurality of sub-streams constituting one video frame, the stream merger 224 may generate the video frame. If an error has occurred in at least one of the plurality of sub-streams, the stream merger 224 may not generate the video frame.

The stream merger 224 may merge the plurality of sub-streams in a combination order that is based on a channel index, by using the total number of wireless channels and channel index information that are respectively included in a WT field of a header and a WN field. The stream merger 224 may differentiate the payload and the CRC code based on the length information of the payload included in the LEN field of the header and may generate the video frame by combining pieces of video data included in the payload of the sub-stream. The stream merger 224 may differentiate a valid bit (or actual data) and a dummy bit (or dummy data) in the payload by using pixel partitioning information included in a partitioning type field PART_TYPE of the header and may generate the video frame by selectively merging only the valid bit.

The plurality of sub-streams that constitute one video frame depending on a wireless channel state may be received during a plurality of transmission periods. As such, whenever the sub-stream is received, the stream merger 224 may determine whether the reception of the plurality of sub-streams corresponding to one video frame is completed. For example, the stream merger 224 may determine whether the reception of a plurality of sub-streams constituting the video frame is completed, by using total transmission period information of the video frame and time index information that are respectively included in a SST field and a SSN field of the header. If the reception of the video frame is not completed, the stream merger 224 may temporarily store a sub-stream into the storage 225. If the reception of the plurality of sub-streams constituting one video frame is completed, the stream merger 224 may generate the video frame by merging currently input sub-stream and temporarily stored sub-stream.

The storage 225 may store the video frame generated by the stream merger 224. The storage 225 may store a part of the plurality of sub-streams constituting one video frame. The storage 225 may include at least one memory that is included in the data processor 220 or included outside the data processor 220 and is electrically connected with the data processor 220.

The decoder 226 may decompress (e.g., decode) the video frame stored in the storage 225. For example, the decoder 226 may reconstruct the video frame of a FHD resolution or a HD resolution into the video frame of a UHD resolution. The decoder 226 may decompress the video frame based on compression rate information included in a CR field of the header. For example, in the case where a compression rate is $1/4$, the decoder 226 may decompress the video frame such that the resolution of the reconstructed video increases four times. As another example, in the case where the compression rate is $1/8$, the decoder 226 may decompress the video frame such that the resolution of the reconstructed video increases eight times. According to some exemplary embodiments, the decoder 226 may be omitted.

The video reconstructor 227 may change the format of the decompressed video frame into the first video format. For example, the video reconstructor 227 may reconstruct the format of the decompressed video frame into the first video format that is capable of being output to a display (e.g., compatible with the display). For example, the first video format may be a CEA format or a high definition multimedia interface (HDMI) format. According to some exemplary embodiments, the video reconstructor 227 may be omitted.

The main controller 228 may verify a structure (or a format) of the sub-stream by using version information included in a version field VER of a header. The main controller 228 may control each of elements included in the data processor 220 based on the verified structure of the sub-stream.

The main controller 228 may verify a wireless channel state. For example, the main controller 228 may verify the state of each of the plurality of wireless channels with reference to at least one of pixel partitioning information included in the partitioning type field PART_TYPE of the header of the sub-stream, load balancing rate information included in a LD_BAL field thereof, total transmission period information included in the SST field thereof, and channel state information received from the plurality of wireless receivers 210-1 and 210-2. If the wireless channel state continues to deteriorate, the main controller 228 may warn a user of channel degradation.

The main controller 228 may select a video frame, which is to be output to a display, from the video frame stored in the storage 225, and may generate a control signal indicating the transmission of the video frame to the display. The decoder 226 and the video reconstructor 227 may perform the decompression and the format conversion of the selected video frame in response to the control signal of the main controller 228 and may transmit the performed result to the display.

The main controller 228 may select the video frame, which is to be transmitted to the display, based on whether an error has occurred in the sub-stream. For example, in the case where there is no error in the plurality of sub-streams, the main controller 228 may merge the plurality of sub-streams and may direct the decoder 226 and the video reconstructor 227 to transmit the generated video frame to the display. As another example, in the case where an error has occurred in at least one of the plurality of sub-streams, the main controller 228 may direct the decoder 226 and the video reconstructor 227 to transmit the immediately-preceding video frame to the display. For example, the immediately-preceding video frame may indicate a video frame that is generated immediately before a video frame in which an error has occurred.

The main controller 228 may select the video frame, which is to be transmitted to the display, based on whether the reception of a plurality of sub-streams constituting one video frame is completed. For example, a plurality of sub-streams constituting one video frame may be received during two transmission periods. If a part of the plurality of sub-streams is received during a first transmission period, the main controller 228 may direct the decoder 226 and the video reconstructor 227 to transmit the immediately-preceding video frame to the display. Afterwards, if the reception of the remaining part of the plurality of sub-streams is completed during a second transmission period, the main controller 228 may merge the sub-stream received during the first transmission period and the sub-stream received during the second transmission period and may direct the decoder 226 and the video reconstructor 227 to transmit the generated video frame to the display.

The wireless receiving apparatus 200 may determine whether an error has occurred, by using the CRC code inserted into the sub-stream independently of an error check that a wireless receiver module performs. Accordingly, the wireless receiving apparatus 200 may accurately determine whether the received video frame is damaged.

In the case where an error has occurred in the received video frame or in the case where the reception of the video frame is delayed, the wireless receiving apparatus 200 may output an alternative video frame (e.g., an immediately-preceding video frame), thereby allowing the user to perceive the degradation of image quality or image errors to a lesser degree.

Since a UHD video is transmitted by using a frequency bandwidth of a FHD video, a wireless transmission service of the UHD video may be stably provided by using a conventional wireless transmitting and receiver.

Figure 5:
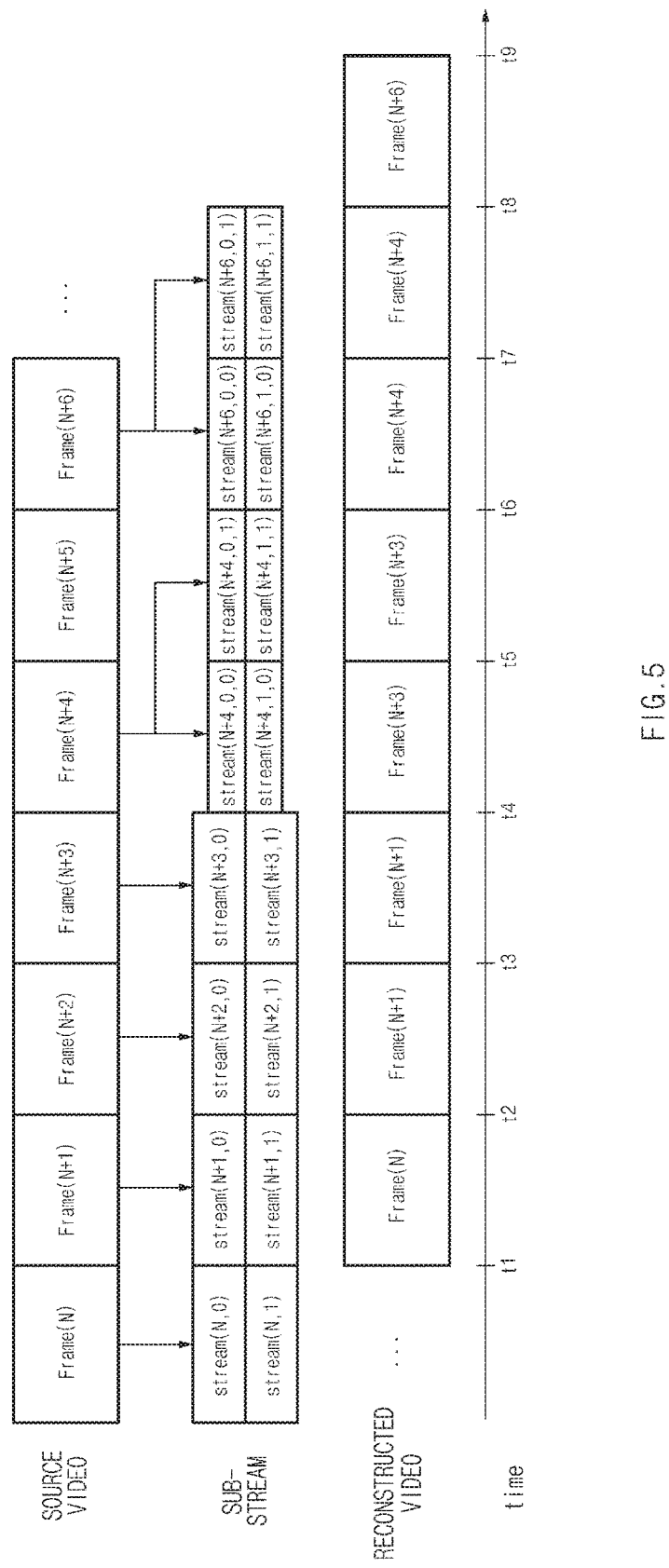
FIG. 5 is a diagram illustrating an example of video reconstruction of a wireless transmitting and receiving system, according to an exemplary embodiment.

FIG. 5 is a diagram illustrating an example of video reconstruction of a wireless transmitting and receiving system, according to an exemplary embodiment.

A plurality of sub-streams is exemplified in FIG. 5 as being transmitted through two wireless channels. A source video illustrated in FIG. 5 may be a video frame that is transmitted to the data processor 110 of the wireless transmitting apparatus 100. The sub-stream may be a plurality of sub-streams that are generated based on the video frame by the data processor 110. The reconstructed video may be the video frame reconstructed by the data processor 220 of the wireless receiving apparatus 200.

Referring to FIG. 5, at a first time point t1, the wireless transmitting apparatus 100 may transmit two sub-streams, which is generated by using an N-th video frame, to the wireless receiving apparatus 200 through two wireless channels. At a second time point t2, the wireless receiving apparatus 200 may verify that there is no error in two sub-streams constituting the N-th video frame, and may output the N-th video frame to a display. The wireless receiving apparatus 200 may store the successfully received N-th video frame in the storage 225.

At the second time point t2, the wireless transmitting apparatus 100 may transmit two sub-streams, which are generated by using a (N+1)-th video frame, to the wireless receiving apparatus 200 through two wireless channels. At a third time point t3, the wireless receiving apparatus 200 may verify that there is no error in two sub-streams constituting the (N+1)-th video frame, and may output the (N+1)-th video frame to the display. The wireless receiving apparatus 200 may store the successfully received (N+1)-th video frame in the storage 225.

At the third time point t3, the wireless transmitting apparatus 100 may transmit two sub-streams, which is generated by using a (N+2)-th video frame, to the wireless receiving apparatus 200 through two wireless channels. A transmission error may occur in at least one of two sub-streams constituting the (N+2)-th video frame. At a fourth time point t4, the wireless receiving apparatus 200 may verify the occurrence of an error in at least one of sub-streams constituting the (N+2)-th video frame and may output the (N+1)-th video frame stored in the storage 225 to the display instead of the (N+2)-th video frame.

At the fourth time point t4, the wireless transmitting apparatus 100 may transmit two sub-streams, which is generated by using a (N+3)-th video frame, to the wireless receiving apparatus 200 through two wireless channels. At a fifth time point t5, the wireless receiving apparatus 200 may verify that there is no error in two sub-streams constituting the (N+3)-th video frame, and may output the normally received (N+3)-th video frame to the display. The wireless receiving apparatus 200 may store the successfully received (N+3)-th video frame in the storage 225.

At the fourth time point t4 and the fifth time point t5, the wireless transmitting apparatus 100 may verify channel degradation and may generate two (stream (N+4, 0, 0) and stream (N+4, 1, 0)) of four sub-streams constituting a (N+4)-th video frame by using a part of the (N+4)-th video frame. At the fifth time point t5, the wireless transmitting apparatus 100 may transmit two (stream (N+4, 0, 0) and stream (N+4, 1, 0)) of four sub-streams constituting the (N+4)-th video frame to the wireless receiving apparatus 200 through two wireless channels. At a sixth time point t6, the wireless receiving apparatus 200 may verify that there is no error in the received two sub-streams and may verify that the reception of all sub-streams constituting the (N+4)-th video frame is not completed. As such, the wireless receiving apparatus 200 may output the (N+3)-th video frame stored in the storage 225 to the display. The wireless receiving apparatus 200 may temporarily store the received two sub-streams (stream (N+4, 0, 0) and stream (N+4, 1, 0)) in the storage 225.

Between the fifth time point t5 and the sixth time point t6, the wireless transmitting apparatus 100 may generate the remaining two (stream (N+4, 0, 1) and stream (N+4, 1, 1)) of four sub-streams constituting the (N+4)-th video frame by using the remaining part of the (N+4)-th video frame. At the sixth time point t6, the wireless transmitting apparatus 100 may transmit the remaining two (stream (N+4, 0, 1) and stream (N+4, 1, 1)) of four sub-streams constituting the (N+4)-th video frame to the wireless receiving apparatus 200 through two wireless channels. At a seventh time point t7, the wireless receiving apparatus 200 may verify that there is no error in the received two sub-streams and may verify that the reception of all sub-streams constituting the (N+4)-th video frame is completed. The wireless receiving apparatus 200 may reconstruct the (N+4)-th video frame by merging all sub-streams constituting the (N+4)-th video frame and may output the reconstructed (N+4)-th video frame to the display. The wireless receiving apparatus 200 may store the normally received (N+4)-th video frame in the storage 225.

Between the sixth time point t6 and the seventh time point t7, the wireless transmitting apparatus 100 may skip the generation of sub-streams using a (N+5)-th video frame and may generate two (stream (N+6, 0, 0) and stream (N+6, 1, 0)) of four sub-streams constituting a (N+6)-th video frame by using a part of the (N+6)-th video frame. At the seventh time point t7, the wireless transmitting apparatus 100 may transmit two (stream (N+6, 0, 0) and stream (N+6, 1, 0)) of four sub-streams constituting the (N+6)-th video frame to the wireless receiving apparatus 200 through two wireless channels. At an eighth time point t8, the wireless receiving apparatus 200 may verify that there is no error in the received two sub-streams and may verify that the reception of all sub-streams constituting the (N+6)-th video frame is not completed. As such, the wireless receiving apparatus 200 may output the (N+4)-th video frame stored in the storage 225 to the display. The wireless receiving apparatus 200 may temporarily store the received two sub-streams (stream (N+6, 0, 0) and stream (N+6, 1, 0)) in the storage 225.

Between the seventh time point t7 and the eighth time point t8, the wireless transmitting apparatus 100 may generate the remaining two (stream (N+6, 0, 1) and stream (N+6, 1, 1)) of four sub-streams constituting the (N+6)-th video frame by using the remaining part of the (N+6)-th video frame. At the eighth time point t8, the wireless transmitting apparatus 100 may transmit the remaining two (stream (N+6, 0, 1) and stream (N+6, 1, 1)) of four sub-streams constituting the (N+6)-th video frame to the wireless receiving apparatus 200 through two wireless channels. At a ninth time point t9, the wireless receiving apparatus 200 may verify that there is no error in the received two sub-streams and may verify that the reception of all sub-streams constituting the (N+6)-th video frame is completed. The wireless receiving apparatus 200 may reconstruct the (N+6)-th video frame by merging all sub-streams constituting the (N+6)-th video frame and may output the reconstructed (N+6)-th video frame to the display. The wireless receiving apparatus 200 may store the successfully received (N+6)-th video frame in the storage 225.

According to an exemplary embodiment described with reference to FIG. 5, in the case where an error occurs in a video frame due to wireless channel degradation or in the case where the data transmission rate of a wireless channel is low, the wireless receiving apparatus 200 may output the immediately-preceding video frame to the display, and thus the wireless receiving apparatus 200 may allow a user to sense less image damage.

Figure 6:
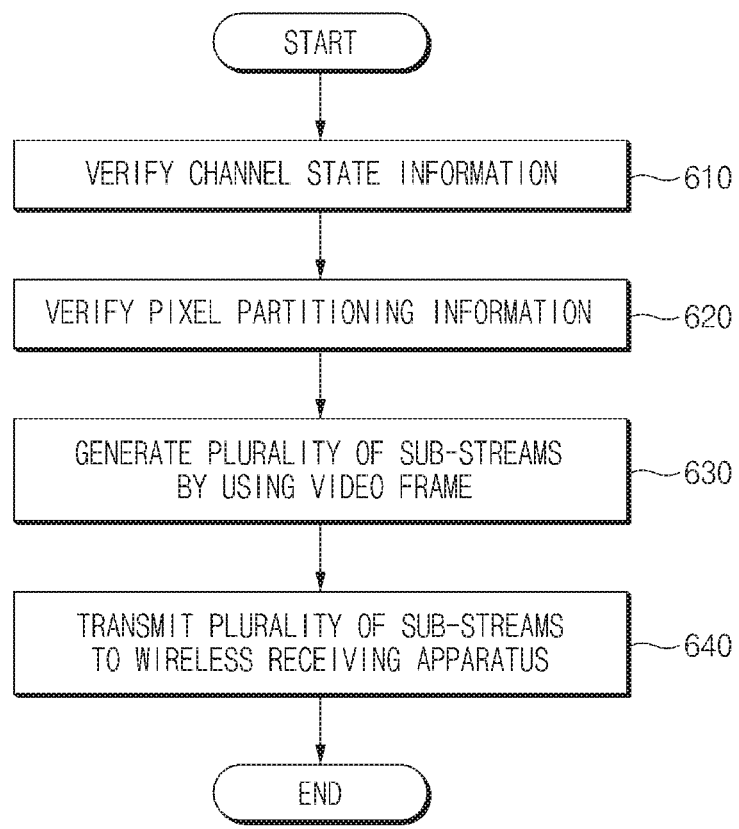
FIG. 6 is a flowchart illustrating a video transmitting method of a wireless transmitting apparatus, according to an exemplary embodiment.

FIG. 6 is a flowchart illustrating a video transmitting method of a wireless transmitting apparatus, according to an exemplary embodiment. The operations outlined herein are exemplary and can be implemented in any combination thereof, including combinations that exclude, add, or modify certain operations.

Referring to FIG. 6, in operation 610, the wireless transmitting apparatus 100 may verify channel state information of each of the plurality of wireless transmitters 120-1 and 120-2. For example, the channel state information may include a PER. According to an aspect of an exemplary embodiment, the plurality of wireless transmitters 120-1 and 120-2 included in the wireless transmitting apparatus 100 may receive the channel state information from the plurality of wireless receivers 210-1 and 210-2 included in the wireless receiving apparatus 200.

In operation 620, the wireless transmitting apparatus 100 may verify pixel partitioning information of at least one of the plurality of wireless transmitters 120-1 and 120-2. For example, the pixel partitioning information may be information indicating the configuration form (e.g., a ratio, a location, or the like) of actual data and dummy data included in the sub-stream to be transmitted to the wireless receiving apparatus 200. Operation 620 may be performed prior to operation 610 or operation 620 and operation 610 may be performed at the same time. In some embodiments, operation 620 may be skipped.

In operation 630, the wireless transmitting apparatus 100 may generate a plurality of sub-streams by using the video frame. The wireless transmitting apparatus 100 may generate a plurality of sub-streams based on at least one of the channel state information and the pixel partitioning information.

The wireless transmitting apparatus 100 may determine whether the video frame is compressed and a compression rate, based on at least one of the channel state information, the pixel partitioning information, and the resolution of the video frame. The wireless transmitting apparatus 100 may determine an amount of data (or a load sharing rate) of the video frame to be included in a plurality of sub-streams based on at least one of the channel state information and the pixel partitioning information. The wireless transmitting apparatus 100 may determine the number of sub-streams (or the total transmission period of the video frame) based on at least one of the channel state information and the pixel partitioning information. The wireless transmitting apparatus 100 may generate a plurality of sub-streams depending on the compression rate of the video frame, the number of video frames, and an amount of data of the video frame to be included in each of the plurality of sub-streams, which are determined. The wireless transmitting apparatus 100 may generate the sub-stream in consideration of a location at which dummy data is inserted by the pixel partitioning.

In operation 640, the wireless transmitting apparatus 100 may transmit the plurality of sub-streams to the wireless receiving apparatus 200 through the plurality of wireless transmitters 120-1 and 120-2. The wireless transmitting apparatus 100 may transmit the plurality of sub-streams to the wireless receiving apparatus 200 according to a WiHD standard. After changing a plurality of sub-streams into sub-streams of a first video format, the wireless transmitting apparatus 100 may transmit the sub-streams of the first video format.

Figure 7:
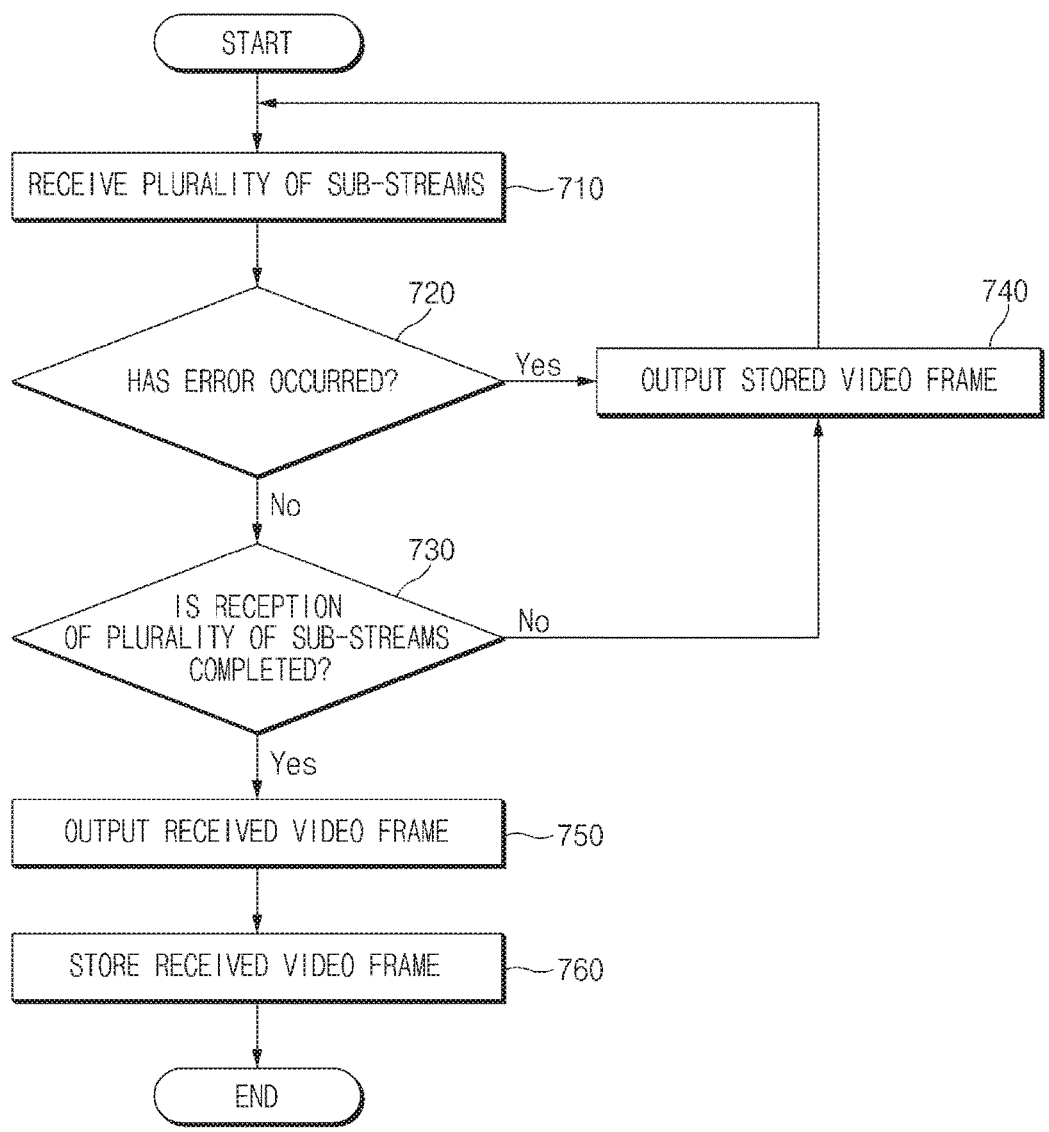
FIG. 7 is a flowchart illustrating a video reconstructing method of a wireless receiving apparatus, according to an exemplary embodiment.

FIG. 7 is a flowchart illustrating a video reconstructing method of a wireless receiving apparatus, according to an exemplary embodiment.

Referring to FIG. 7, in operation 710, the wireless receiving apparatus 200 may receive a plurality of sub-streams from the wireless transmitting apparatus 100 through the plurality of wireless receivers 210-1 and 210-2.

According to an aspect of an exemplary embodiment, in operation 720, the wireless receiving apparatus 200 may determine whether an error occurs in at least one of the plurality of sub-streams. The wireless receiving apparatus 200 may determine whether an error has occurred in any of the plurality of sub-streams, by using a CRC code included in each of the plurality of sub-streams.

If the error has occurred in at least one of the plurality of sub-streams, in operation 740, the wireless receiving apparatus 200 may output an immediately-preceding video frame stored in the storage 225 to a display.

If the error has not occurred in any of the plurality of sub-streams, in operation 730, the wireless receiving apparatus 200 may determine whether the reception of a plurality of sub-streams constituting one video frame is completed.

If the reception of a plurality of sub-streams constituting one video frame is not completed, in operation 740, the wireless receiving apparatus 200 may output the immediately-preceding video frame stored in the storage 225 to the display.

If the reception of a plurality of sub-streams constituting one video frame is completed, in operation 750, the wireless receiving apparatus 200 may output the received video frame to the display. For example, the wireless receiving apparatus 200 may generate (or reconstruct) the video frame by merging the plurality of sub-streams. The wireless receiving apparatus 200 may output the generated video frame to the display.

In operation 760, the wireless receiving apparatus 200 may store the received video frame in the storage 225. For example, the wireless receiving apparatus 200 may store the video frame, which is normally received without an error, in the storage 225.

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed. Thus, various components, including modules, units, etc., of an apparatus as described herein may be implemented by software, hardware, or a combination of both. For example, a data processor, a transmitter, a receiver, a generator, a converter, a controller, a converter, a calculator, a merger, a reconstructor, etc. may be implemented with at least one processor and a computer-readable storage medium storing instructions which, when executed by the processor, cause the processor to perform various operations.

According to various exemplary embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical media (e.g., a compact disc read-only memory (CD-ROM) and a digital versatile disc (DVD), a magneto-optical media (e.g., a floptical disk)), an embedded memory, and the like. The instruction may include codes created by a compiler or codes that are capable of being executed by a computer by using an interpreter. According to various exemplary embodiments, a module or a program module may include at least one of the above elements, or a part of the above elements may be omitted, or other elements may be further included.

According to various exemplary embodiments, a high-definition video may be stably transmitted even though wireless channel quality is not good, by generating a sub-stream in consideration of the wireless channel state.

According to various exemplary embodiments, a sub-stream may be generated in consideration of a wireless channel state, as a result, a high-quality image may be stably received even when the wireless channel quality is poor and an occurrence of error in a video image may be easily recognized.

According to various embodiments, a user may be less likely to experience image degradation or image error even if an error occurs in a received video image or reception of a video image is delayed.

According to various exemplary embodiments, operations executed by modules, program modules, or other elements may be executed by a successive method, a parallel method, a repeated method, or a heuristic method, or at least one part of operations may be executed in different sequences or omitted. Alternatively, other operations may be added. While the present disclosure has been shown and described with reference to various exemplary embodiments thereof, it will be understood by those skilled in the art that various changes in form and details may be made therein without departing from the spirit and scope of the present disclosure as defined by the appended claims and their equivalents.

What is claimed is:

1. A wireless receiving apparatus comprising:
a plurality of wireless receivers configured to receive a plurality of sub-streams constituting a video frame; and
a data processor configured to:
determine whether an error occurs in each of the plurality of sub-streams;
in response to determining that an error does not occur in any of the plurality of sub-streams and a reception of the plurality of sub-streams constituting the video frame is completed within a total transmission period, merge the plurality of sub-streams to generate the video frame;
transmit the video frame to a display that is electrically connected to the wireless receiving apparatus; and
in response to determining that an error occurs in at least one of the plurality of sub-streams or the reception of the plurality of sub-streams constituting the video frame is not completed within the total transmission period, transmit an immediately-preceding video frame to the display.

2. The wireless receiving apparatus of claim 1, wherein the data processor is further configured to:
determine whether the reception of the plurality of sub-streams constituting the video frame is completed by using total transmission period information and time index information of a video frame included in a header of each of the plurality of sub-streams.

3. The wireless receiving apparatus of claim 2, wherein the data processor is further configured to, in response to determining that the reception of the plurality of sub-streams constituting the video frame is not completed, temporarily store some of the plurality of sub-streams constituting the video frame in a memory.

4. The wireless receiving apparatus of claim 3, wherein the data processor is further configured to, in response to determining that reception of a remainder of the plurality of sub-streams constituting the video frame is completed, merge some of the plurality of sub-streams temporarily stored in the memory with the remainder of the plurality of sub-streams to generate the video frame.

5. The wireless receiving apparatus of claim 1, wherein the data processor is further configured to verify channel index information included in a header of the each of the plurality of sub-streams and merge the plurality of sub-streams in a combination order based on the channel index information.

6. The wireless receiving apparatus of claim 1, wherein the data processor is further configured to differentiate a valid bit and a dummy bit of a payload of each of the plurality of sub-streams using pixel partitioning information included in a header of each of the plurality of sub-streams and merge respective valid bits of the plurality of sub-streams to generate the video frame.

7. The wireless receiving apparatus of claim 1, wherein the data processor is further configured to verify a position of a cyclic redundancy check (CRC) code included in each of the plurality of sub-streams using payload length information included in a header of each of the plurality of sub-streams and determine whether an error occurs in each of the plurality of sub-streams using the CRC code.

8. The wireless receiving apparatus of claim 1, wherein the data processor is further configured to verify a compression rate of the video frame using compression rate information included in a header of each of the plurality of sub-streams, decompress the video frame to correspond to the compression rate, and transmit the decompressed video frame to the display.

9. The wireless receiving apparatus of claim 1, wherein the data processor is further configured to convert a format of the video frame to a format capable of being played in the display and transmit the video frame, the format of which is converted, to the display.

10. A data processor comprising:
a cyclic redundancy check (CRC) calculator configured to determine whether an error occurs in each of a plurality of sub-streams received from a plurality of wireless receiving apparatuses;
a stream merger configured to, in response to determining that an error does not occur in any of the plurality of sub-streams, merge the plurality of sub-streams to generate a video frame; and
a main controller configured to, in response to determining that an error does not occur in any of the plurality of sub-streams and a reception of the plurality of sub-streams constituting the video frame is completed within a total transmission period, transmit the video frame to a display that is electrically connected to the wireless receiving apparatus, and in response to determining that an error occurs in at least one of the plurality of sub-streams or the reception of the plurality of sub-streams constituting the video frame is not completed within the total transmission period, transmit an immediately-preceding video frame to the display.

11. The data processor of claim 10, wherein the stream merger is further configured to determine whether the reception of the plurality of sub-streams constituting the video frame is completed by using total transmission period information and time index information of a video frame included in a header of each of the plurality of sub-streams, and in response to determining that the reception of the plurality of sub-streams constituting the video frame is not completed, temporarily store some of the plurality of sub-streams in a memory.

12. The data processor of claim 11, wherein the stream merger is further configured to, in response to determining that the reception of a remainder of the plurality of sub-streams constituting the video frame is completed, merge some of the plurality of sub-streams temporarily stored in the memory with the remainder of the plurality of sub-streams to generate the video frame.

13. The data processor of claim 10, wherein the stream merger is further configured to verify channel index information included in a header of each of the plurality of sub-streams and merge the plurality of sub-streams in a combination order based on the channel index information.

14. The data processor of claim 10, wherein the stream merger is further configured to differentiate a valid bit and a dummy bit of a payload of each of the plurality of sub-streams using pixel partitioning information included in a header of each of the plurality of sub-streams and merge respective valid bits of the plurality of sub-streams to generate the video frame.

15. The data processor of claim 10, wherein the CRC calculator is further configured to verify a position of a CRC code included in each of the plurality of sub-streams using payload length information included in a header of each of the plurality of sub-streams, and determine whether an error occurs in each of the plurality of sub-streams using the CRC code.

16. The data processor of claim 10, further comprising:
a decoder configured to verify a compression rate of the video frame using compression rate information included in a header of each of the plurality of sub-streams, decompress the video frame to correspond to the compression rate, and transmit the decompressed video frame to the display.

17. The data processor of claim 10, further comprising:
a video reconstructor configured to convert a format of the video frame to a format capable of being played in the display and transmit the video frame, the format of which is converted, to the display.

18. The data processor of claim 10, further comprising:
a plurality of stream converters configured to receive a plurality of sub-streams from the plurality of wireless receiving apparatuses, convert a format of the plurality of sub-streams, and transmit the plurality of sub-streams, the format of which is converted, to the CRC calculator.

19. A video reconstructing method of a wireless receiving apparatus, the method comprising:

receiving a plurality of sub-streams constituting a video frame;

determining whether an error occurs in each of the plurality of sub-streams;

in response to determining that an error does not occur in any of the plurality of sub-streams and a reception of the plurality of sub-streams constituting the video frame is completed within a total transmission period, merging the plurality of sub-streams to generate the video frame;

transmitting the video frame to a display that is electrically connected to the wireless receiving apparatus; and in response to determining that an error occurs in at least one of the plurality of sub-streams or the reception of the plurality of sub-streams constituting the video frame is not completed within the total transmission period, transmitting an immediately-preceding video frame to the display.

* * * * *